(No Model.)

W. G. SEARS.
METHOD OF MAKING TOOTHED CYLINDERS.

No. 353,465. Patented Nov. 30, 1886.

Attest:
F. H. Schott
Fred E. Tasker

Inventor:
William Goff Sears
Per J. E. Tasker, atty.

UNITED STATES PATENT OFFICE.

WILLIAM GOFF SEARS, OF CHATTANOOGA, TENNESSEE.

METHOD OF MAKING TOOTHED CYLINDERS.

SPECIFICATION forming part of Letters Patent No. 353,465, dated November 30, 1886.

Application filed December 18, 1885. Serial No. 186,054. (No model.)

*To all whom it may concern:*

Be it known that I, WILLIAM GOFF SEARS, a citizen of the United States, residing at Chattanooga, in the county of Hamilton and State of Tennessee, have invented certain new and useful Improvements in Methods of Forming Teeth and Ridges upon Cylinders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in the process of making cylinders having teeth and ridges and adapted to be used in combination with the other parts of a cotton-picking stem, the object being to provide a method of making, by means of which the said cylinders may be produced rapidly and cheaply; and my improved process consists in forming the external surface of metallic cylinder-blanks with circumferential ridges by spinning, or other equivalent means, and in then punching out rows of teeth between the said ridges by means of any suitable punching or stamping apparatus, which can operate upon the interior surface of the cylinder to project the teeth outward.

In order to afford one example of means for carrying out my process, drawings are furnished herewith, in which—

Figure 1:
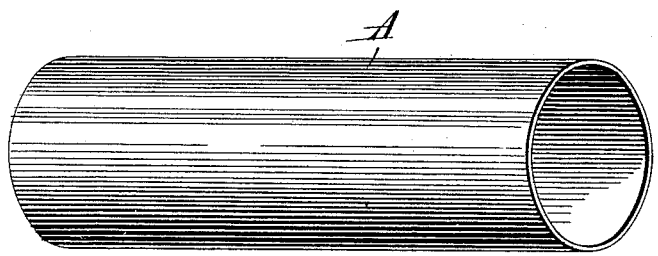
Figure 2:
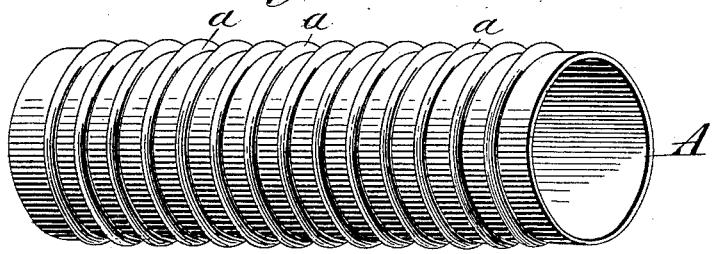
Figure 3:
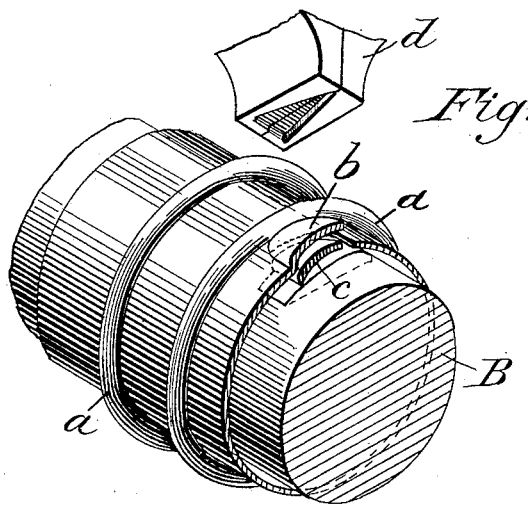
Figure 4:
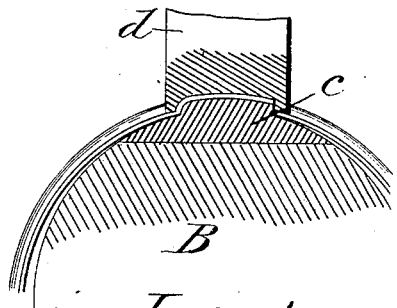

Figure 1 is a perspective of a cylinder-blank. Fig. 2 is a perspective of the same after it has been formed with circumferential ridges. Fig. 3 is a view showing an anvil and swage for forming the teeth, and Fig. 4 is a section through the same when both are in operative position.

The first step in my process is to take cylinder-blanks made in any desired shape, of any metal, and cut to any length adapted to suit the purpose in view, and then spin upon the surface of these blanks circumferential ridges *a*, as shown in Fig. 2. The cylinders thus formed with ridges or projections *a* are to be provided with rows of teeth *b*, situated between the ridges *a* and struck from the body of the metal itself, so as to project outward and forward. These teeth by my process are to be struck out by means of any suitable punching device operating upon the interior surface of the cylinder to cut and raise the teeth and to force the points of the same outward, the base of the teeth still adhering to the cylinder.

In the drawings, B represents a mandrel upon which the cylinder A is placed. This mandrel is provided with an anvil, *c*, made of any shape in which it is desired to form the teeth—as, for instance, a triangular shape—and *d* is a swage which is to be placed on the outside of the cylindrical surface opposite the interior anvil. Percussion of the swage upon the cylinder will drive the metal down upon and around the anvil, thus forming the tooth. In the drawings one anvil only is shown.

Obviously, it is most convenient to use a single anvil, although more than one might be used simultaneously provided the stamping shall in every case be done from within the cylinder.

Having thus described my invention, what I claim as new, and desire to secure by Letters Patent, is—

The herein-described method of making toothed and ridged cylinders, which consists in spinning ridges upon the blank cylinders and in punching out teeth between the said ridges from within the interior of the cylinder, substantially as shown and described.

In testimony whereof I affix my signature in presence of two witnesses.

WILLIAM GOFF SEARS.

Witnesses:
PHILIP MAURO,
FRED E. TASKER.